United States Patent [19]

Showalter

[11] Patent Number: 5,718,653

[45] Date of Patent: Feb. 17, 1998

[54] DIFFERENTIAL ASSEMBLY FOR TRANSFER CASES AND VEHICLE DRIVELINES

[75] Inventor: Dan J. Showalter, Plymouth, Mich.

[73] Assignee: Borg-Warner Automotive, Inc., Sterling Heights, Mich.

[21] Appl. No.: 616,333

[22] Filed: Mar. 15, 1996

Related U.S. Application Data

[63] Continuation-in-part of Ser. No. 101,140, Aug. 2, 1993, Pat. No. 5,499,951.

[51] Int. Cl.$^6$ ................................ F16H 48/06; F16H 57/08
[52] U.S. Cl. .................... 475/230; 475/220; 475/231; 475/331; 180/249
[58] Field of Search ........................... 475/220, 221, 475/230, 231, 236, 331, 336; 180/249; 74/665 F, 665 GB, 665 GC

[56] References Cited

U.S. PATENT DOCUMENTS

| | | | |
|---|---|---|---|
| 3,848,691 | 11/1974 | Dolan | 180/44 R |
| 4,644,822 | 2/1987 | Batchelor | 74/695 |
| 4,718,303 | 1/1988 | Fogelberg | 74/710.5 |
| 4,848,508 | 7/1989 | Smirl et al. | 180/248 |
| 4,959,043 | 9/1990 | Klotz et al. | 475/230 |
| 4,977,796 | 12/1990 | Littke | 74/665 F X |
| 4,989,686 | 2/1991 | Miller et al. | 180/197 |
| 5,284,068 | 2/1994 | Frost | 74/665 |
| 5,286,238 | 2/1994 | Shimizu et al. | 475/221 |
| 5,304,103 | 4/1994 | Schlosser | 475/230 |
| 5,334,116 | 8/1994 | Baxter, Jr. | 475/204 |
| 5,407,024 | 4/1995 | Watson et al. | 180/248 |
| 5,533,424 | 7/1996 | Mimura | 475/231 X |
| 5,545,102 | 8/1996 | Burgman et al. | 475/230 |
| 5,584,777 | 12/1996 | Sander et al. | 475/230 |

FOREIGN PATENT DOCUMENTS

| | | |
|---|---|---|
| 1410061 | 10/1975 | United Kingdom. |
| 1460441 | 1/1977 | United Kingdom. |
| 2 218 762 | 11/1989 | United Kingdom. |

*Primary Examiner*—Khoi Q. Ta
*Attorney, Agent, or Firm*—Brinks Hofer Gilson & Lione; Greg Dziegielewski

[57] ABSTRACT

A differential assembly for a transfer case or other motor vehicle application comprehends a pair of side gears which flank a centrally disposed spider driven by an input member and having a plurality of spokes or shafts and bevel pinion gears disposed thereon. An annular member retains the bevel gears on the spider. In a first embodiment, the annular member is retained on the spider by cooperating elongate slots in the member which receive the shafts of the spider and a snap ring which extends about the circumference of the annular member. In an alternate embodiment, the pinion gears include projecting spherical surfaces which are complementary to and seat within spherical recesses on the inner surface of the annular member.

17 Claims, 5 Drawing Sheets

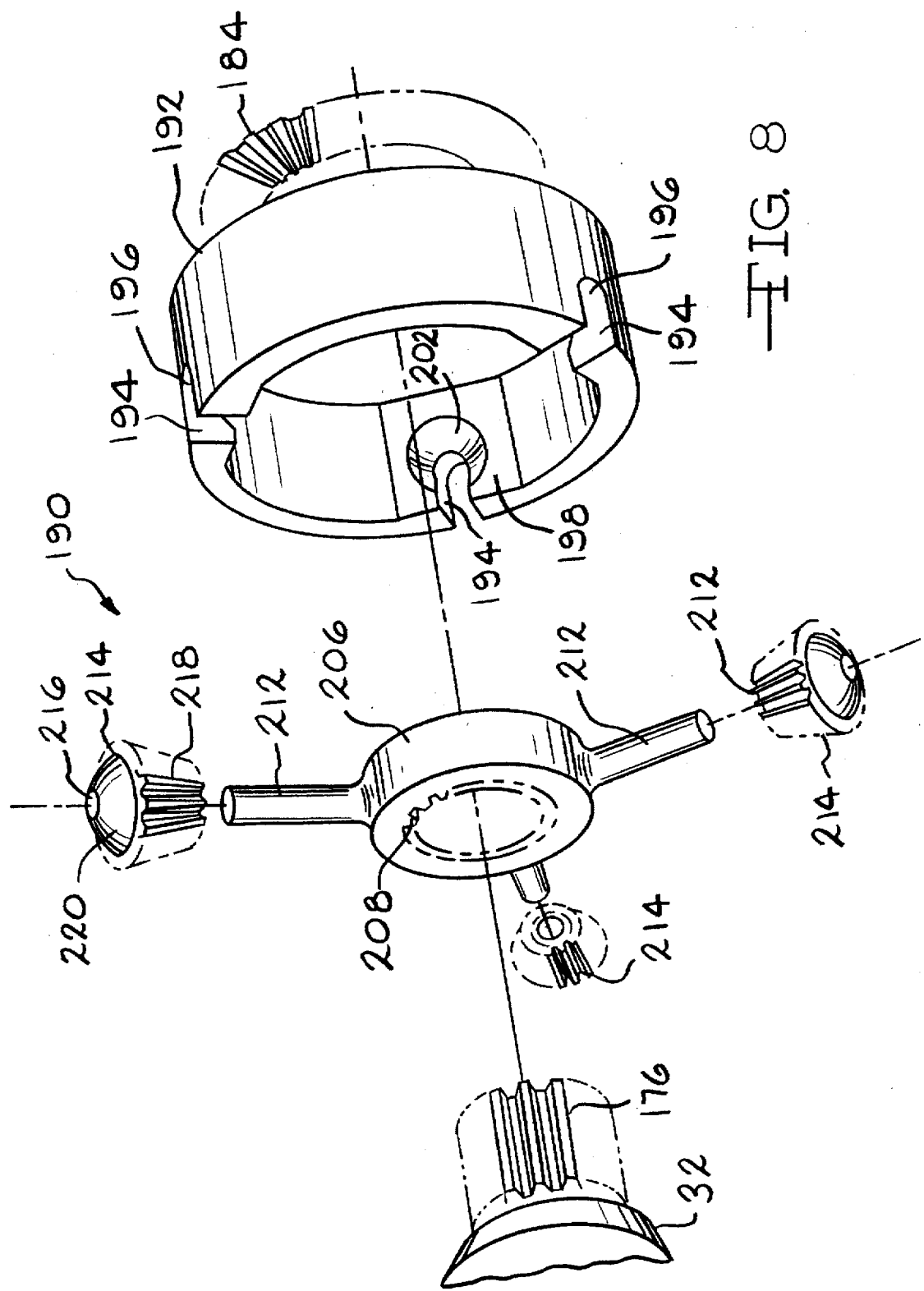

5,718,653

DIFFERENTIAL ASSEMBLY FOR TRANSFER CASES AND VEHICLE DRIVELINES

CROSS REFERENCE TO APPLICATION

This patent application is a continuation-in-part of patent application Ser. No. 08/101,140 filed Aug. 2, 1993, now U.S. Pat. No. 5,499,951, granted Mar. 19, 1996.

BACKGROUND OF THE INVENTION

The invention relates generally to differentials and more particularly to a differential assembly for use in transfer cases and the like having an internal spider, a plurality of pinion gears and an annular retaining member.

In general, there are two basic types of power transfer mechanisms, such as transfer cases, that are associated with manual and automatic transmissions for directing power to the four wheels of a motor vehicle. These are the full time or all wheel drive type in which all four wheels of the vehicle are driven and the part time type in which two wheels are normally driven and the other two wheels are selectively driven.

Many transfer cases, particularly those of the full time type, are equipped with a differential that allows the outputs to turn at different speeds. These differentiated transfer cases split the input torque between the respective outputs for the front and rear wheels of the automobile according to the physical characteristics of the differential. However, it is also known that the torque split between the two outputs can be modulated to meet certain operating conditions. U.S. Pat. No. 4,718,303 granted to Mark J. Fogelberg on Jan. 12, 1988 discloses such a differentiated transfer case which includes an electromagnetic friction clutch which operates on the two outputs to modulate the torque split between the front and rear drive axles of the vehicle. This modulatable friction clutch allows the transfer case to easily and readily adapt to changing vehicle conditions without detracting from its four wheel drive capabilities. See also U.S. Pat. No. 4,989,686 granted to Alan L. Miller et al. on Feb. 5, 1991 for a system for controlling torque transmission in a four wheel drive vehicle.

Another type of transfer case is the on demand type which can be considered a species of the part time type. In this type two wheels are normally driven and the other two wheels are automatically driven in response to an external stimulus such as slippage of the normally driven wheels. These on demand type transfer cases customarily include a friction type clutch, such as a viscous coupling connecting two elements of the differential that allows the two outputs to turn at different speeds up to a predetermined speed differential according to the physical characteristics of the friction clutch.

The torque split between the two outputs of these on demand type transfer cases can be modulated by using an electromagnetic friction clutch as disclosed in U.S. Pat. No. 5,407,024, granted Apr. 18, 1995, all of the above patents being incorporated in this patent specification by reference.

SUMMARY OF THE INVENTION

A differential assembly for a transfer case or other motor vehicle application comprehends a pair of side gears which flank a centrally disposed spider driven by an input shaft and having a plurality of spokes and bevel pinion gears disposed thereon. An annular member retains the bevel gears on the spider. In a first embodiment, the annular member is retained on the spider through cooperating elongate apertures or slots in the member which receive the shafts of the spider and a snap ring which extends about the circumference of the annular member and retains the shafts in the apertures. In an alternate embodiment, the pinion gears include projecting spherical surfaces which are complementary to and seat within recessed spherical surfaces on the inner surface of the annular member. In both embodiments, the annular member floats on the spider and bevel gears and maintains them in an operating relationship with a pair of side bevel gears.

Thus it is an object of the present invention to provide a differential assembly for use in transfer cases and vehicle drivelines.

It is a further object of the present invention to provide a differential assembly having a floating annular member which retains the bevel gears on the spider and maintains the assembly in operating relationship.

It is a still further object of the present invention to provide a differential assembly having a spider with a plurality of radial spokes which receive a pinion gear and which are received within slots or apertures in a surrounding annular member.

It is a still further object of the present invention to provide a differential assembly having a spider with a plurality of spokes and bevel gears having spherical projections which are received within complementarily configured recesses in an annular member which surrounds the spider and bevel gears.

The above and further objects, features and advantages of the invention will become apparent from the following description taken in conjunction with the accompanying drawings wherein like reference numbers refer to the same component, element or feature.

BRIEF DESCRIPTION OF THE DRAWINGS

FIG. 8 is an exploded perspective view of an alternate embodiment transfer case differential assembly according to the present invention.

DESCRIPTION OF THE PREFERRED AND ALTERNATE EMBODIMENTS

Figure 1:
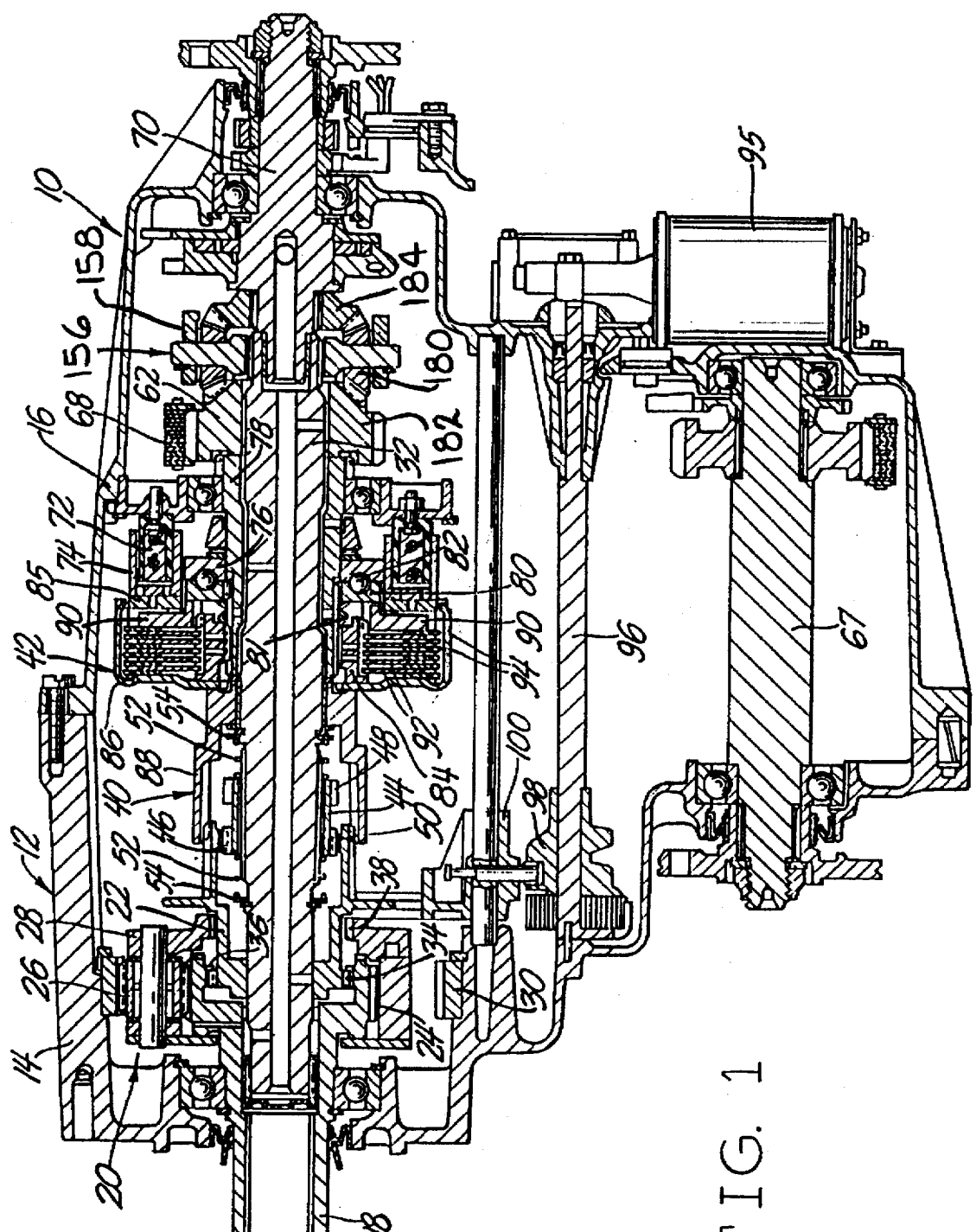
FIG. 1 is a full sectional view of a two speed transfer case according to the present invention showing the shift sleeve in a high speed position.

Referring now to the drawing, FIG. 1 shows an exemplary transfer case 10 which includes a housing assembly 12 formed by front and back housing sections 14 and 16 suitably secured together. Front housing section 14 receives a transmission output shaft (not shown) that is drive connected to an internally splined tubular input stub shaft 18. The transmission output shaft is driven by a power source such as an internal combustion engine of an automobile, van, pickup truck or SUV.

The input stub shaft 18 is part of a speed change unit indicated generally at 20. The speed change unit 20 comprises a planetary gear set and a range shift sleeve 22 having a "High Range" direct drive position shown in FIG. 1 and a "Low Range" reduced ratio drive position shown in FIG. 5. The planetary gear set includes an input sun gear 24 integrally formed on the input stub shaft 18. Sun gear 24 is meshed with a plurality of planet gears 26 (one shown) that are individually journalled on a planetary carrier 28. The planet gears 26 mesh with a ring gear 30 that is non-rotatably secured in the housing 12.

The shift sleeve 22 is slidably mounted on the end of a main input shaft 32. The shift sleeve 22 has external gear teeth 34 at one end that engage internal gear teeth 36 of the input stub shaft 18 when the shift sleeve 22 is in the High Range position which is shown in FIG. 1 thus establishing a direct 1:1 ratio drive from the input stub shaft 18 to the shift sleeve 22.

Figure 5:
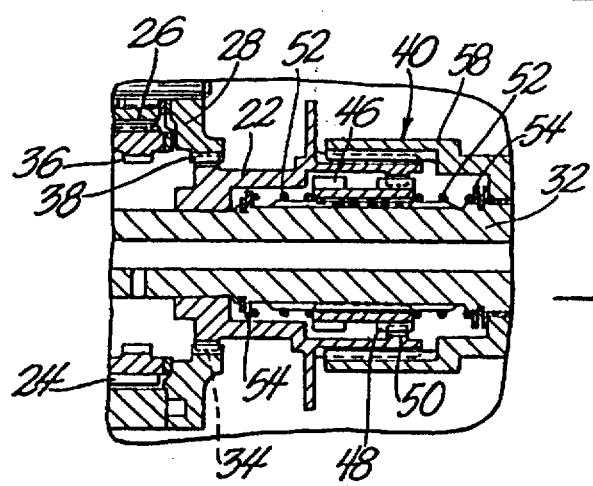
FIG. 5 is a fragmentary sectional view of the two speed transfer case showing the shift sleeve in a low speed position with the lock-up hub engaged.

Alternatively, the external gear teeth 34 engage internal gear teeth 38 of the planetary carrier 28 when the shift sleeve 22 is in the Low Range position which is shown in FIG. 5, thus establishing a reduction ratio drive from the stub shaft 18 to the shift sleeve 22 via the planet gears 26 and the planetary carrier 28.

The transfer case 10 further includes a positive or dog clutch 40 for drive connecting the shift sleeve 22 to the main input shaft 32 and an electromagnetic friction clutch 42 for transferring torque from the shift sleeve 22 to one of the outputs of the transfer case 10 as explained below.

The dog clutch 40 comprises an internally splined lock-up hub 44 that is slidably mounted on external splines of the main input shaft 32 and disposed inside an enlarged portion of the range shift sleeve 22. The lock-up hub 44 has two axially spaced sets of gear teeth 46 and 48 that are engageable with an internal set of gear teeth 50 of the range shift sleeve 22. The lock-up hub 44 is axially located on the main input shaft 32 by two coil springs 52 that engage opposite ends of the lock-up hub 44 and react against respective retaining rings 54 carried by the main input shaft 32.

The slidably mounted hub 44 and the coil springs 52 provide a delay connection between the shift sleeve 22 and the main input shaft 32. This time delay mechanism cooperates with the electromagnetic friction clutch 42 to permit dynamic shifting of the shift sleeve 22 back and forth between the high range and low range positions. This is explained in more detail below.

Figure 6:
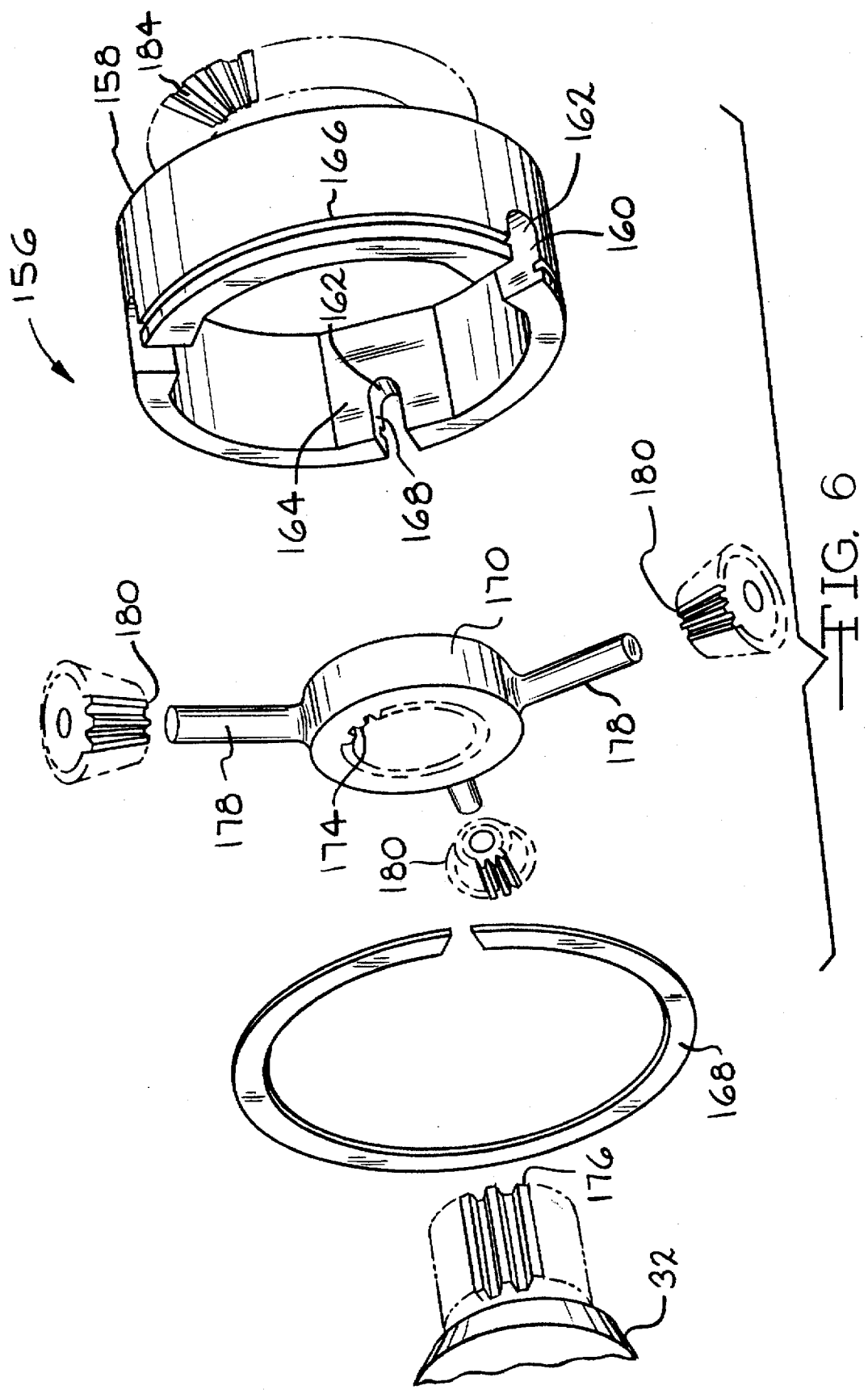
FIG. 6 is an exploded perspective view of a preferred embodiment transfer case differential assembly according to the present invention.

The transfer case 10 also includes a differential assembly 156. The preferred embodiment differential assembly 156 that is illustrated in FIGS. 1 and 6 is a bevel gear, epicyclic differential having an annular member or carrier 158. The annular carrier 158 may be a net shape formed part. The annular carrier 158 defines a plurality, typically three or four, axially extending apertures, channels or slots 160. Preferably, the slots 160 are disposed at equal 120° intervals if there are three such slots and disposed at equal 90° intervals if there are four such slots 160. The closed ends of the slots 160 are defined by semi-cylindrical surfaces 162 which are disposed substantially medially along the axial length of the annular carrier 158. The inner surface of the annular carrier 158 defines a plurality of flats or chordal surfaces 164, which are associated with and circumferentially centered on a respective one of the plurality of slots 160. Spaced axially from the circular face of the annular carrier 158 in which the open mouths of the slots 160 are disposed is a circumferential groove 166 which receive a complementarily sized snap or retaining ring 168.

Positioned centrally within the annular carrier 158 is a spider 170. The spider 170 includes a centrally disposed opening defining a plurality of female splines or gear teeth 174. The female splines or gear teeth 174 are complementary to and engage a plurality of male splines or gear teeth 176 formed on the end of the main input shaft 32. The spider 170 includes a plurality, preferably three or four, radially extending spokes or stub shafts 178 which are equal in number to and complementarily arranged such that they are received within the channels or slots 160 in the annular carrier 158. Each of the spokes or stub shafts 178 receives, positions and rotatably supports a respective bevel pinion gear 180.

The bevel gears 180 and the spider 170 are received within the interior of the annular carrier 158 and the stub shafts 178 seat within the elongate slots 160 and are retained there by the snap ring 168. Adjacent each face of the annular carrier 158 is a respective one of a pair of side gears 182 and 184. The side gear 182 is integrally formed with or secured to a chain drive sprocket 66 which drives an offset output shaft 67 in the lower part of the transfer case 10 through a drive chain 68. The offset output shaft 67 typically drives the front axles through a front differential of a four-wheel drive vehicle. The side gear 184 is coupled through a suitable spline set to a coaxially disposed rear output shaft 70 which drives the rear axles through a rear differential (both not illustrated).

The differential gear set 156 operates in a well-known manner to split the torque received from the main input shaft 32 between the output shafts 67 and 70 through the respective side gears 182 and 184. The differential gear set 156 is commonly referred to as a center or interaxle differential inasmuch as the output shafts 67 and 70 drive axle assemblies which typically include their own differentials (not illustrated) which accommodate side-to-side speed variations.

Figure 7:
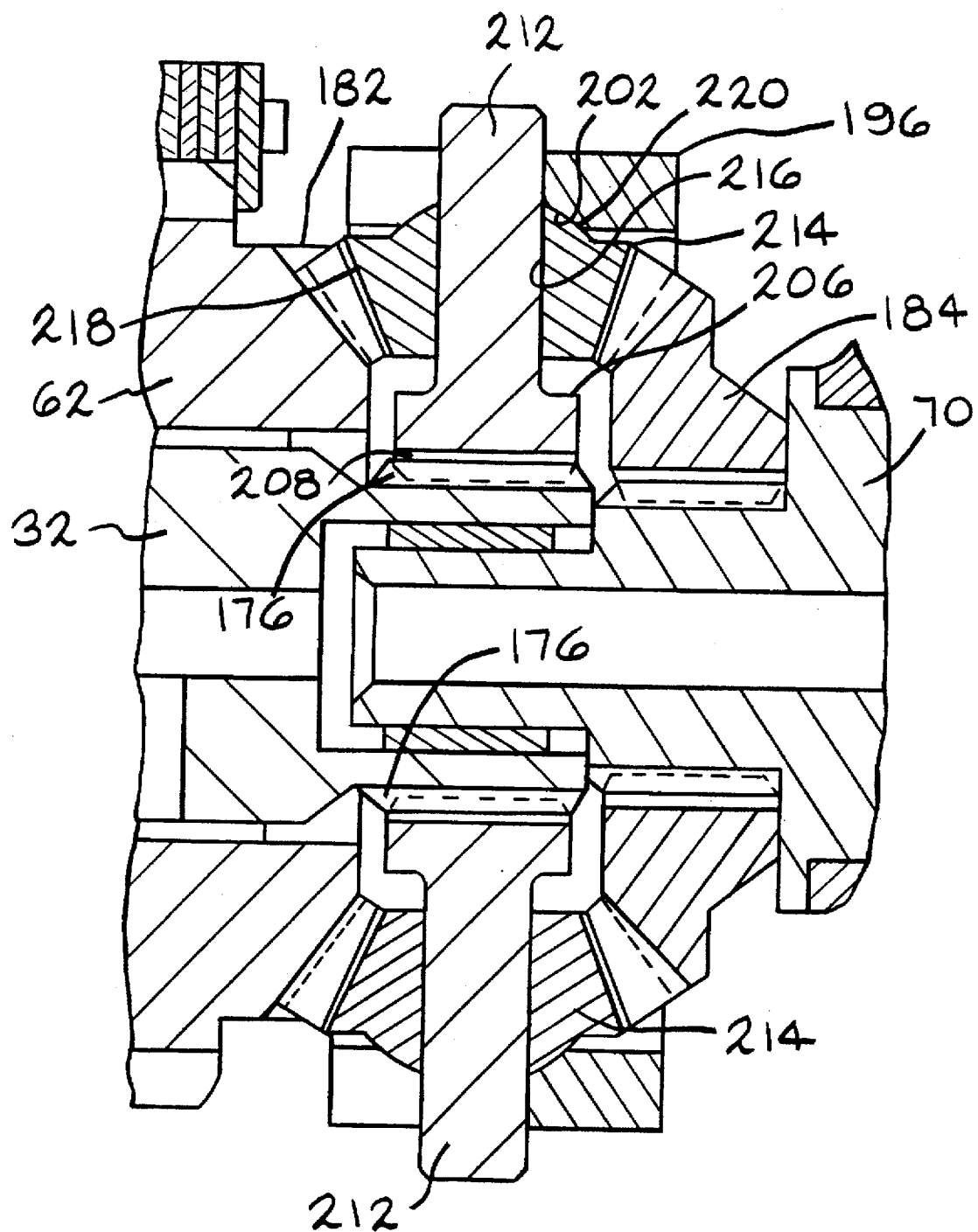
FIG. 7 is a fragmentary, full sectional view of an alternate embodiment transfer case differential assembly according to the present invention.

Referring now to FIGS. 1, 7 and 8, an alternate embodiment differential assembly 190 is illustrated. The alternate embodiment differential assembly 190 is also a bevel gear, epicyclic differential having an annular member or carrier 192. The annular carrier 192 defines a plurality, typically three or four, axially extending apertures, channels or slots 194. The closed ends of the slots 194 are defined by semi-circular surfaces 196 which are disposed substantially medially along the axial length of the annular carrier 192. Preferably, the slots 194 are disposed at equal, 120° intervals if there are three such slots and disposed at equal 90° intervals if there are four such slots 194. The inner surface of the annular carrier 192 defines a plurality of flats or chordal surfaces 198 which are associated with and circumferentially centered on a respective one of the plurality of slots 194. Within each of the chordal surfaces 198 is a spherical recess 202 which is concentric with the reference cylinder partially formed by the semi-cylindrical surface 162, i.e., coaxial with the axis of the surfaces 162. The spherical recess 202 represents only a portion of a sphere and may be readily formed by a spherical cutter. Alternatively, the carrier 192 may be a net shape formed part.

Positioned centrally within the annular carrier 192 is a spider 206. The spider 206 includes a centrally disposed opening defining a plurality of female splines or gear teeth 208. The female splines or gear teeth 208 are complementary to and engage a plurality of male splines or gear teeth 176 formed on a terminal portion of the main input shaft 32. The spider 206 includes a plurality, preferably three or four, radially extending spokes or stub shafts 212 which are equal in number to and complementarily arranged such that they are received within the channels or slots 194 in the annular carrier 192. Each of the spokes or stub shafts 212 receives, positions and rotatably supports a respective bevel gear 214. Each of the bevel gears 214 includes a through bore 216 which defines an axis about which bevelled male gear teeth 218 are arranged. The bevel gears 214 also include spherical surfaces 220 concentric with the bores 216. The spherical surfaces 220 define a radius equal to the radius of the spherical recess 202 and seat therein when the spider 206 and associated bevel gears 214 are disposed within the annular carrier 192. Adjacent each face of the annular carrier 192 is a respective one of a pair of side gears 182 and 184 described above.

It will be appreciated that in order to assemble the alternate embodiment differential assembly 190, the bevel gears 214 are first placed on the stub shafts 212 in contact with the central portion of the spider 206. The spider 206 and the associated bevel gears 214 may then be placed within the annular carrier 192 with the stub shafts 212 aligned with the slots 194. The bevel gears 214 may then be moved radially outwardly such that the spherical surfaces 220 of the bevel gears 214 seat within the complementarily configured spherical recesses 202. The pair of side gears 182 and 184 maintain the bevel gears 214 in the positions illustrated in FIG. 7, thereby maintaining the annular carrier 192 in position and maintaining the assembled state of the differential assembly 190. As it does in the preferred embodiment differential assembly 156, the annular carrier 192 floats in the assembly. The assembled state is achieved without the necessity of a complementary groove 166 and snap ring 168 as utilized in the preferred embodiment differential assembly 156, such positioning being achieved by the cooperation of the spherical surfaces 220 and 202 of the bevel pinion gears 214 and the annular carrier 192, respectively.

As mentioned above, the transfer case 10 further includes an electromagnetic friction clutch 42 which is physically located between the range shift sleeve 22 and the differential gear set 156. The electromagnetic friction clutch 42 transfers torque from the shift sleeve 22 to one of the outputs of the transfer case 10. The electromagnetic friction clutch 42 thus serves as a biasing clutch for modulating torque transfer through the differential gear set 156. That is, the electromagnetic friction clutch 42 selectively and operationally adds or subtracts torque delivered to the respective output shafts 67 and 70. The friction clutch 42 also cooperates with the delay mechanism comprising the lock-up hub 44 and the coil springs 52 to allow dynamic shifting of the shift sleeve 22 as indicated above.

In the preferred embodiment, the electromagnetic friction clutch 41 is comprised of a electromagnetic coil 72 which is suitably arranged within the housing 16 and which is partially surrounded by a soft iron rotor 74. Electric conductors or cables (not shown) provide electric current to the electromagnetic coil 72 to generate magnetic flux. The rotor 74 is formed with a suitable slotted end face and it is attached to an inner ring 76 which rotates on a first extension sleeve 78 that is journalled on the main input shaft 32 and drive connected to the side gear 62 and sprocket 66 at one end.

Figure 2:
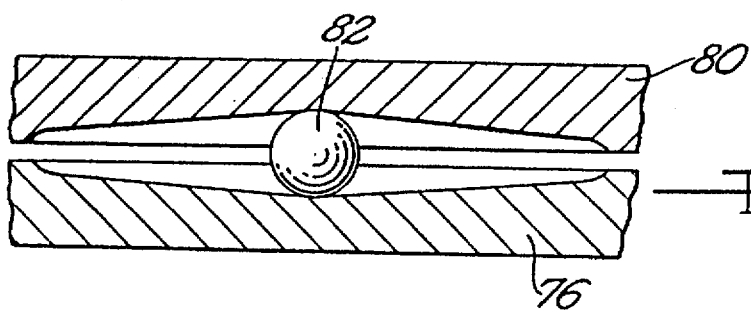
FIG. 2 is a flat pattern development of a section of one locking ball and associated recesses of coupling rings incorporated in an electromagnetic friction clutch of the two speed transfer case shown in FIG. 1.

The rotor 74 is also coupled to the first extension sleeve 78 through a ball ramp coupling that comprises the inner ring 76, an adjacent coupling ring 80 that is splined to the first extension sleeve 78 and a series of loosely movable locking balls 82. The locking balls 82 are entrapped within a series of conically shaped recesses or ramps 83 (FIG. 2) provided on both the inner ring 76 of the rotor 74 and the ring coupling 80 splined to the first extension sleeve 78. An important design aspect of this coupling is that the geometry of the ball ramp design is such that the coupling is not self locking. This is necessary to ensure that the coupling unit does not self engage without application of a control signal and to ensure positive-release or modulation capability upon termination or reduction of the control signal, respectively.

One or more resilient springs 81 are provided to urge the coupling ring 80 axially toward the inner ring 76 of the rotor 74. Such springs 81 are positioned between end surfaces of the coupling ring 80 and an inner clutch plate collar 84 that is spline connected to the end of the first extension sleeve 78 and held in position by a snap ring. The inner clutch plate collar 84 forms part of the friction clutch portion of the electromagnetic friction clutch 42. This construction automatically positions the rotor 74 so that it does not exert any significant compressive force on the friction clutch 42 when the electromagnetic coil 72 is not energized.

Returning to FIG. 1, the electromagnetic friction clutch 42 further includes a suitable slotted armature or friction disc 85. The friction disc 85 has external splines which cooperate in a driving relationship with complementary internal splines on a clutch housing 86. The clutch housing 86 has an end wall that is splined to a second extension sleeve 88 that rotates on the main input shaft 32. The second extension sleeve 88 is fixed axially on the main input shaft 32 and slidably and non-rotatably connected to the shift sleeve 22 by matching splines.

The friction disc 85 is capable of axial displacement relative to the clutch housing 86 and is arranged for frictional engagement with the slotted end face of the rotor 74. An annular pressure plate 90 is next to the friction disc 85 and connected to the inner clutch plate collar 84 of the friction clutch 42 by splines. Disposed between the pressure plate 90 and the end wall of the housing 86 is a set of interleaved friction plates or discs 92 and 94 that are splined to the inner clutch plate collar 84 and the clutch housing 86, respectively.

TORQUE SPLIT MODULATION

In operation, the shift sleeve 22 may be in the high speed range position as shown in FIG. 1 or in the low speed range shown in FIG. 5; and the electromagnetic coil 72 may be initially deenergized so that there is not any driving connection by way of the electromagnetic friction clutch 42. As such, the torque split to each of the drive axles is determined by the gear geometry of the differential gear set 56 which is 50—50 in the case of the bevel gear differential illustrated. Application of clutch current to the electromagnetic coil 72 generates a magnetic flux which causes the friction disc or armature 85 to be drawn toward the slotted end face of the rotor 74, thereby establishing a frictional driving connection between the rotor 74 and friction disc 85. The friction disc 85 is operatively connected to the main input shaft 32 via the second extension sleeve 88, the shift sleeve 22 and the lock-up hub 44. Consequently, the rotor 74 and the inner coupling ring 76 attached to it turn at the same rotational speed as the main input shaft 32. On the other hand, the coupling ring 80 is operatively connected to the offset output stub shaft 67 via the first extension sleeve 78, the sprocket 66 and the drive chain 68. Consequently the coupling ring 80 turns at the same rotational speed as the offset output shaft 67 and the integral side gear/sprocket 62, 182.

If relative motion exists between the main input shaft 32 and the offset output shaft 67, such motion causes the balls 82 to roll up on the conically shaped recesses 83. As such, the ball ramp coupling forcibly and axially moves the coupling ring 80 and the pressure plate 90, as a unit, and presses the friction plates 92 and 94 together with a compressive force. When pressed together, the friction plates 92 and 94 serve to transmit motive force between the main input shaft 32 which is locked to the shift sleeve 22 and the offset output shaft 67 which is drive connected to the integral sprocket/side gear 62, 182. As such, the friction clutch adds torque to the slower turning of the two side gears 182, 184 and their respective output shafts 67, 70 and subtracts torque from the faster turning or running side gear and output shaft. By modulating the clutch current, the relative rotation of the output shafts 67, 70 may be modulated. That is, with the coupling mechanism being designed to disengage under torque, there must be an additional torque supplied to preliminary coupling to generate the required axial force for holding the friction plates 92 and 94 in engagement. This torque is supplied by the electromagnetic friction clutch 42.

The level of current supplied to the electromagnetic coil 72 of the electromagnetic friction clutch 42 controls the bias torque of the clutch 42. That is, precise control over the torque bias can be achieved by increasing or decreasing the current to the electromagnetic coil 72 in response to various parameters. If desired, a predetermined level of current can be continuously provided to the electromagnetic coil 72. Thus, a consistent torque bias can be applied by the clutch 42. Alternatively, the friction clutch 42 can respond to a relative wheel slip. Details of a control system for controlling torque bias in response to relative wheel slip are disclosed in U.S. Pat. No. 4,989,686 issued Feb. 5, 1991 and assigned to the same assignee as this application; the full text of which is incorporated herein by reference.

DYNAMIC SHIFT OPERATION

The electromagnetic friction clutch 42 also cooperates with the delay mechanism comprising the lock-up hub 44 and coil springs 52 to allow dynamic shifting of the transfer case 10 back and forth between high speed range and low speed range operation.

Assume that the transfer case 10 is operating in the high range with the range shift sleeve 22 displaced to the left, engaging internal gear teeth 36 of input stub shaft 18 and external gear teeth 46 of lock-up hub 44 as shown in FIG. 1.

The following dynamic downshift sequence then takes place when shifting from high speed range to low speed range. The vehicle operator selects low speed range with an electrical switch in the case of an electrically shifted transfer case or begins moving a shift lever towards the low speed range position in the case of a mechanically shifted transfer case. In response a shift control operator 95 rotates shift rod 96 and worm gear 98 which translates yoke 100 and the range shift sleeve 22 to the right as viewed in FIG. 1. The external gear teeth 34 of the range shift sleeve 22 then disengage from the high range gear teeth 36 of the input stub shaft 18 at the same time or near the same time that the range shift sleeve 22 disengages from the teeth 46 of the lock-up hub 44. This disengaged or neutral position is shown in FIG. 3.

Figure 3:
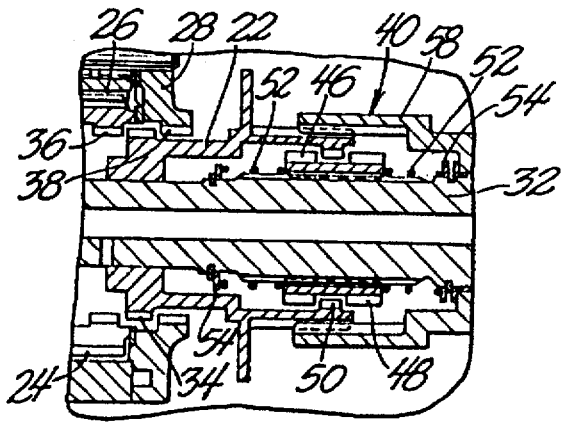
FIG. 3 is a fragmentary sectional view of the two speed transfer case showing the shift sleeve in a neutral position.

It should be noted that the above sequence cannot take place unless the frictional forces in the engaging teeth 36 and 46 resulting from torque that is being applied by the engine to the transfer case 10 via the input stub shaft 18 are less that the forces of the worm gear 98 on the yoke 100 so that the shift sleeve 22 can move to the right from the engage position shown in FIG. 1 to the neutral position shown in FIG. 3. If the frictional forces are greater, the situation is easily rectified by the vehicle operator releasing the throttle which reduces the torque that is applied to the transfer case 10 by the engine. It is also possible to incorporate a throttle position sensor in the shift mechanism, particularly in the case of an electrically shifted transfer case, that allows the shifting sequence to begin only at "tip out" or zero throttle application.

In any event, when the range shift sleeve 22 reaches the neutral position shown in FIG. 3, the translation of the range shift sleeve 22 to the right is continued to engage the gear teeth 34 of the shift sleeve 22 with internal gear teeth 38 of the planetary carrier 28.

Engagement of the chamfered ends of the gear teeth 34 and 38 cause nearly instantaneous acceleration of the two members to a synchronous speed because of the relatively low inertia of the shift sleeve 22 and the associated clutch parts allowing unobjectionable clash engagement in most instances. Alternatively a small synchronizer may be incorporated into a transfer case 10 to equalize the speed of the range shift sleeve 22 with the planetary carrier 28 prior to the engagement of the gear teeth of these two members.

Figure 4:
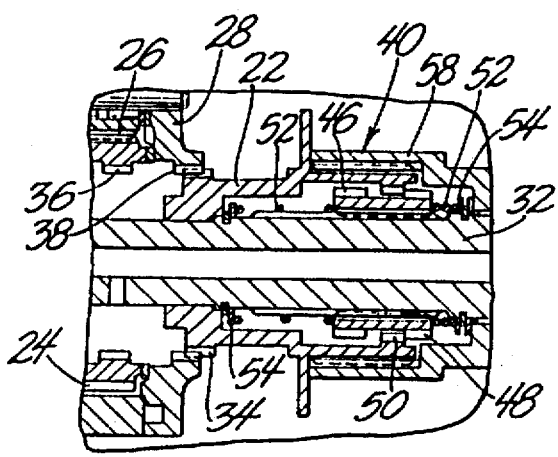
FIG. 4 is a fragmentary sectional view of the two speed transfer case showing the shift sleeve in a low speed position prior to the lock-up hub being engaged.

Continued translation of the range shift sleeve 22 past the neutral position also brings the chamfered internal gear teeth 50 of the shift sleeve 22 into contact (with relative rotational movement between the two) with the chamfered ends of the second set of external gear teeth 48 of the lock-up hub 44. The relative rotational speed between the shift sleeve 22 and the lock-up hub 44 prevents engagement of the gear teeth 48 and 50 and axially displaces the lock-up hub 44 against the bias of right hand coil spring 52 initially. Axial displacement of the lock-up hub 44 continues until the gear teeth 34 engage gear teeth 38 to drivingly connect the shift sleeve 22 to the planetary carrier 28 for low speed range operation as shown in FIG. 4. When this drive connection between the range shift sleeve 22 and the planetary carrier 28 is completed, the electromagnetic friction clutch 42 is energized so that the full clutch capacity is utilized to equalize the speed of the planetary carrier 28 with the speed of the offset output shaft 67 that is drive connected to the side gear 62 by the integral sprocket 66. When equalized, the speed of the range shift sleeve 22 is the same or very nearly the same as the speed of the main input shaft 32 which is drive connected with the side gears 62 and 64 of the differential gear set 56. This synchronization allows the right hand spring 52 to move the delayed engagement lock-up hub 44 to the left into meshing engagement with the range shift sleeve 22 to complete the downshift as shown in FIG. 5.

A dynamic upshift, that is shifting from low speed range to high speed range is done in a similar but reversed sequence.

The relatively large torque capacity of the electromagnetic friction clutch 42 allows dynamic shifting between speed ranges under situations previously not possible with conventional mechanical synchronizers. The dynamic speed range shift may even take place without having to place an automatic transmission in neutral when the transfer case 10 is used with an automatic transmission. When the transfer case 10 is used with a manual transmission, dynamic speed range shifts may be possible without having to disengage the engine clutch and most certainly without having to shift the manual transmission into neutral.

When the transfer case 10 is shifted electrically an upper limit must be placed on the shift speed to avoid engine overspeed. When the transfer case 10 is shifted mechanically such limits are also necessary to avoid engine overspeed and to avoid clutch overspeed in the case of a manual transmission.

The invention has been described in an illustrative manner, and it is to be understood that the terminology which has been used is intended to be in the nature of words of description rather than of limitation. Furthermore, while described within the environment of a motor vehicle transfer case, it should be understood that the differential of the present invention has broad and ready application and use in general mechanical power distribution systems and anywhere the operational benefits of a differential are necessary or desirable.

Obviously, many modifications and variations of the present invention in light of the above teachings may be made. It is, therefore, to be understood that, within the scope of the appended claims, the invention may be practiced otherwise than as specifically described.

I claim:

1. A differential assembly for a vehicle driveline comprising, in combination,
   a spider having a central body portion and a plurality of spokes extending radially from said body portion,
   a plurality of bevel gears, one of said plurality of bevel gears disposed on a respective of one of said plurality of spokes,
   an annular retainer having a plurality of elongate openings for receiving said spokes and an internal surface including a chordal surface adjacent each of said openings, and
   a pair of side bevel gears, each of said side bevel gears engaging said plurality of bevel gears.

2. The differential assembly of claim 1 wherein said annular retainer defines an edge and said openings are elongate slots extending to and defining a mouth at said edge, a circumferential groove in said annular retainer spaced from said edge and a retaining member disposed in said groove.

3. The differential assembly of claim 1 wherein said retaining member is a snap ring.

4. The differential assembly of claim 1 wherein said annular retainer defines an edge and said openings are elongate slots extending to said edge.

5. The differential assembly of claim 1 wherein said annular retainer defines an interior surface and said interior surface includes a chordal surface adjacent each of said openings and said chordal surface includes a spherical recess.

6. The differential assembly of claim 1 wherein said central body portion of said spider includes an aperture having teeth disposed therein.

7. A transfer case assembly for a vehicle driveline comprising, in combination,
   a speed reduction assembly having an input and a reduced speed output,
   a clutch for engaging either one of said input or said reduced speed output,
   a spider operably coupled to said clutch and having a central body portion and a plurality of spokes extending radially from said body portion,
   a plurality of bevel gears, one of said plurality of bevel gears disposed on a respective of one of said plurality of spokes,
   an annular member defining an interior surface and having a plurality of elongate openings for receiving said spokes, said interior surface including flat regions adjacent said openings, and
   a pair of side bevel gears, each of said side bevel gears engaging said plurality of bevel gears.

8. The differential assembly of claim 7 wherein said annular member defines an edge and said openings are elongate slots extending to and defining a mouth at said edge, a circumferential groove in said annular retainer spaced from said edge and a retaining member disposed in said groove.

9. The transfer case assembly of claim 7 wherein said annular member includes an interior surface defining a spherical recess associated with each of said openings and said bevel gears include a spherical projection complementary to said spherical recess.

10. The transfer case assembly of claim 7 wherein said annular member defines an edge and said openings are elongate slots extending to said edge.

11. The transfer case assembly of claim 7 wherein said annular member defines an interior surface and said interior surface includes a chordal surface adjacent each of said openings and said chordal surface includes a spherical recess.

12. The transfer case assembly of claim 7 wherein said central body portion of said spider includes an aperture having teeth disposed therein.

13. A differential assembly comprising, in combination,
    an input member having a splined end,
    a spider having a central body portion defining a splined opening, said splined opening disposed on said splined end of said input member and a plurality of shafts extending radially from said body portion,
    a plurality of bevel gears, one of said plurality of bevel gears disposed on a respective of one of said plurality of shafts,
    an annular member having a plurality of elongate apertures for receiving said shafts,
    a first side bevel gear drivingly connected to a first output member, and
    a second side bevel gear drivingly connected to a second output member,
    each of said side bevel gears engaging said plurality of bevel gears.

14. The differential assembly of claim 13 wherein said annular member defines an edge and said apertures are elongate slots extending to and defining a mouth at said edge, a circumferential groove in said annular retainer spaced from said edge and a retaining member disposed in said groove.

15. The differential assembly of claim 13 wherein said annular member includes an interior surface defining a spherical recess associated with each of said apertures and said bevel gears include a spherical projection complementary to said spherical recess.

16. The differential assembly of claim 13 wherein said annular member defines an edge and said apertures are elongate slots extending to said edge.

17. The differential assembly of claim 13 wherein said annular member defines an interior surface and said interior surface includes a chordal surface adjacent each of said apertures and said chordal surface includes a spherical recess.

* * * * *